Figure 1:
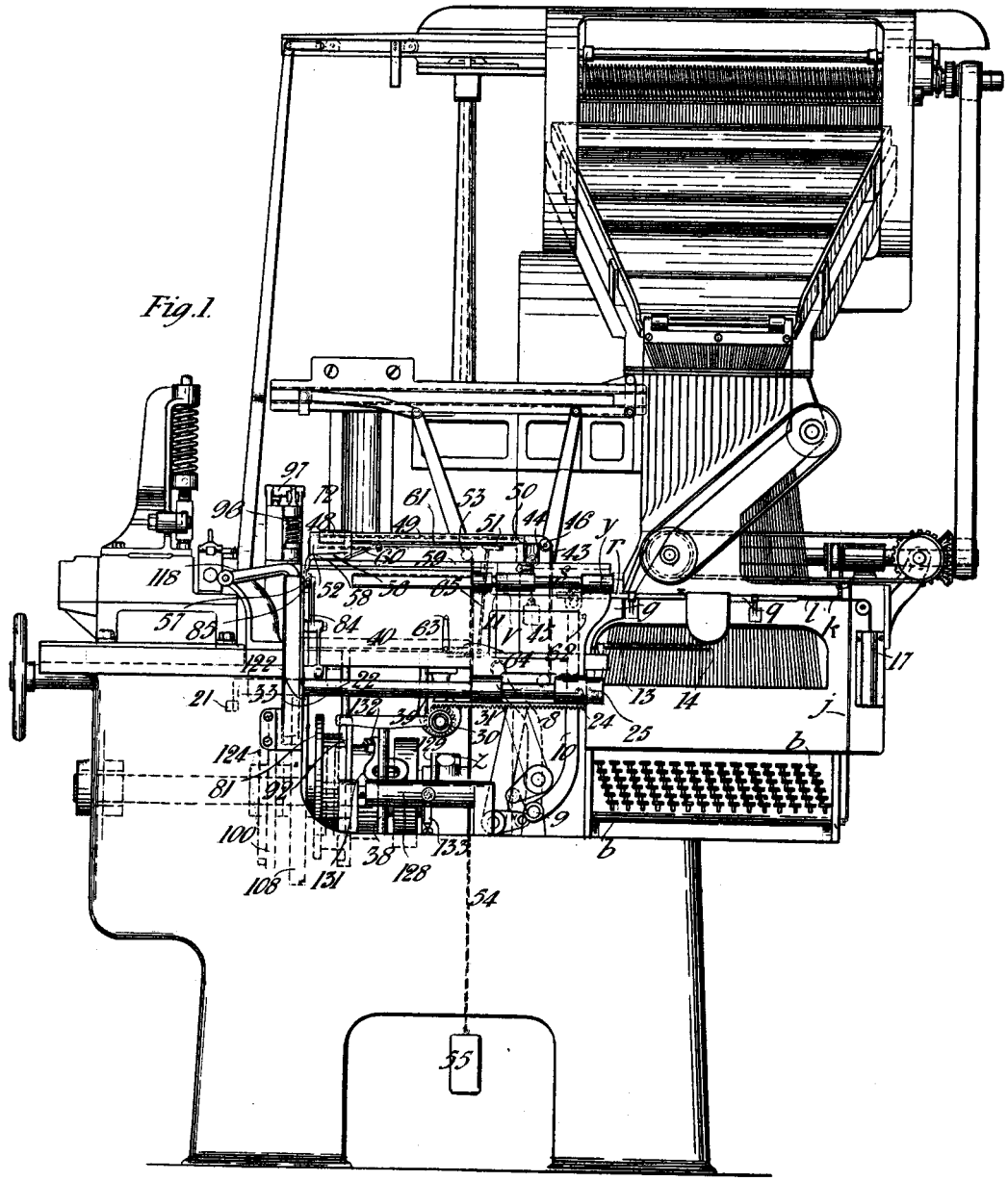

No. 675,829. Patented June 4, 1901.
H. J. S. GILBERT-STRINGER.
APPARATUS FOR COMPOSING AND JUSTIFYING MATRICES AND CASTING TYPES THEREFROM.
(Application filed May 18, 1900.)
(No Model.) 14 Sheets—Sheet 1.

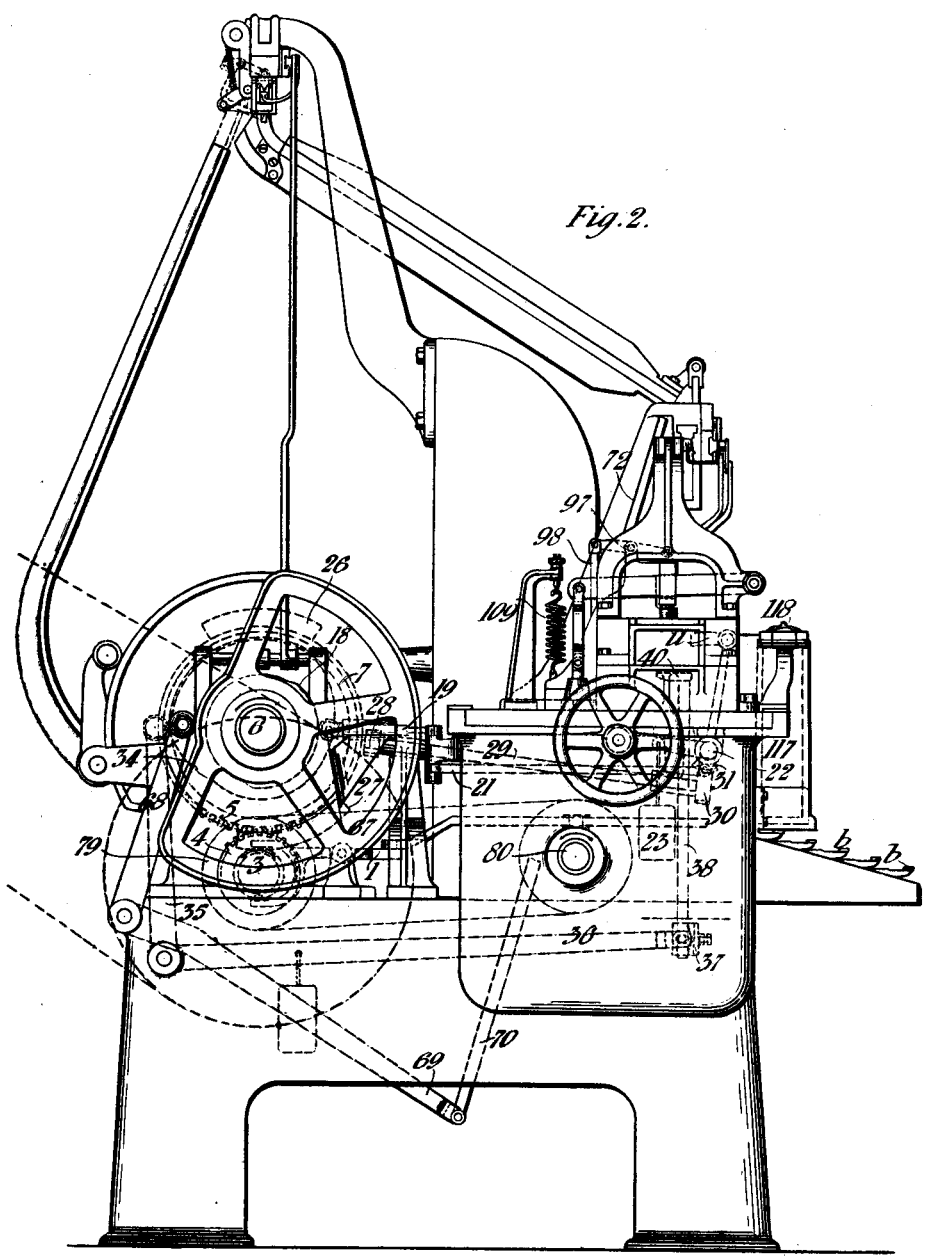

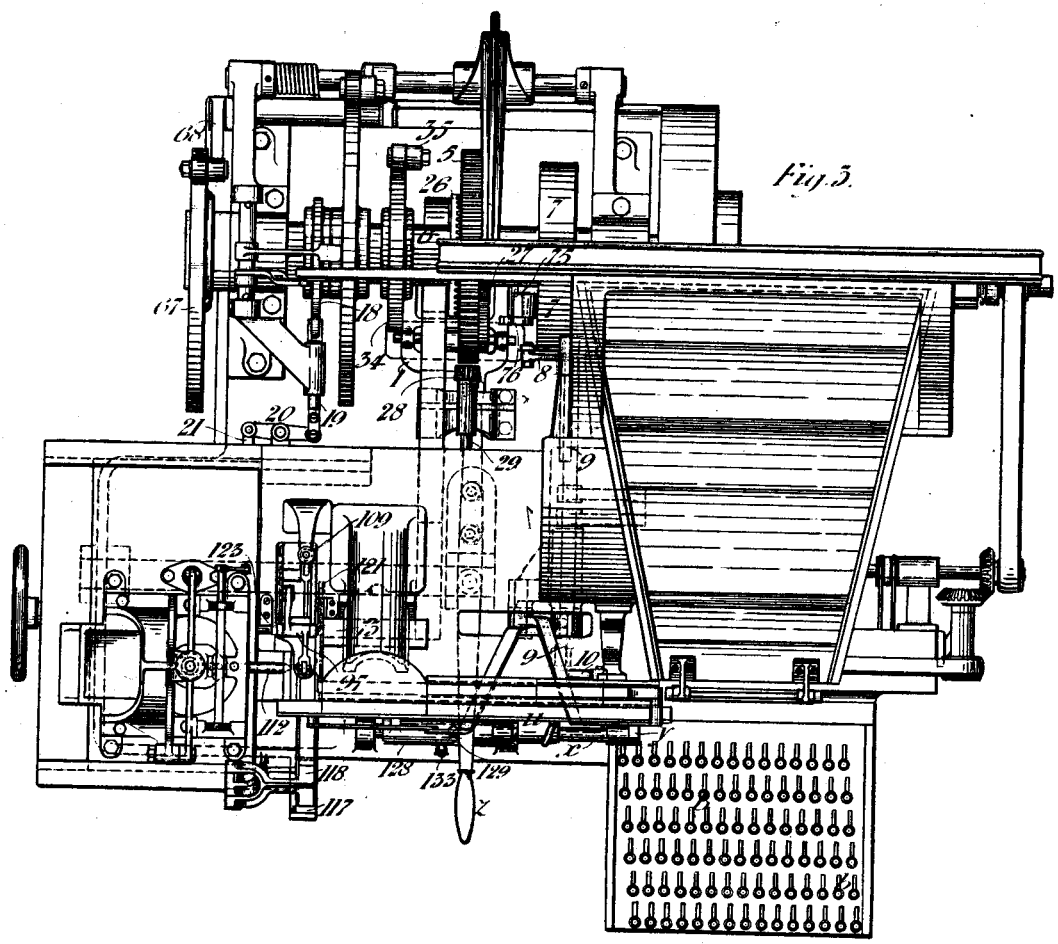

No. 675,829. Patented June 4, 1901.
H. J. S. GILBERT-STRINGER.
APPARATUS FOR COMPOSING AND JUSTIFYING MATRICES AND CASTING TYPES THEREFROM.
(Application filed May 18, 1900.)
(No Model.) 14 Sheets—Sheet 4.
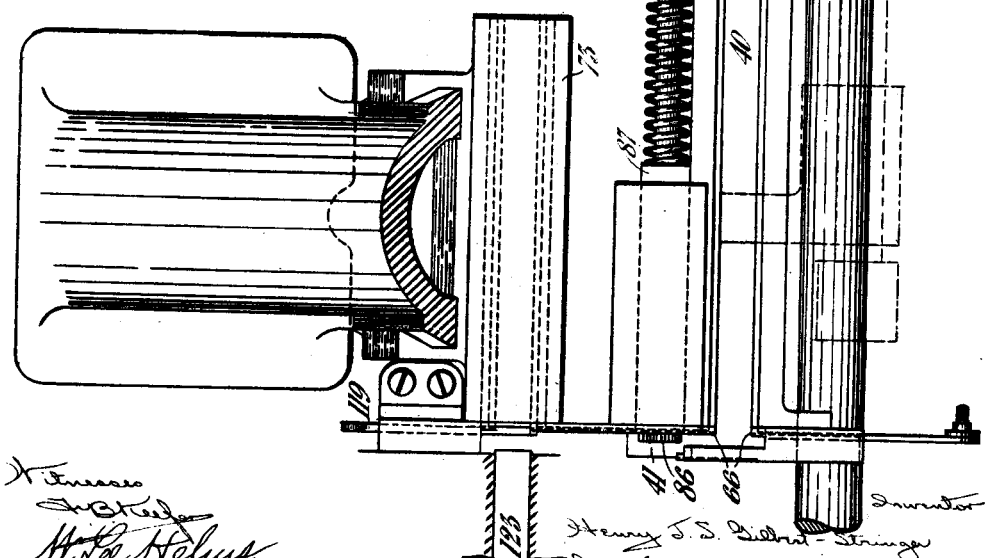

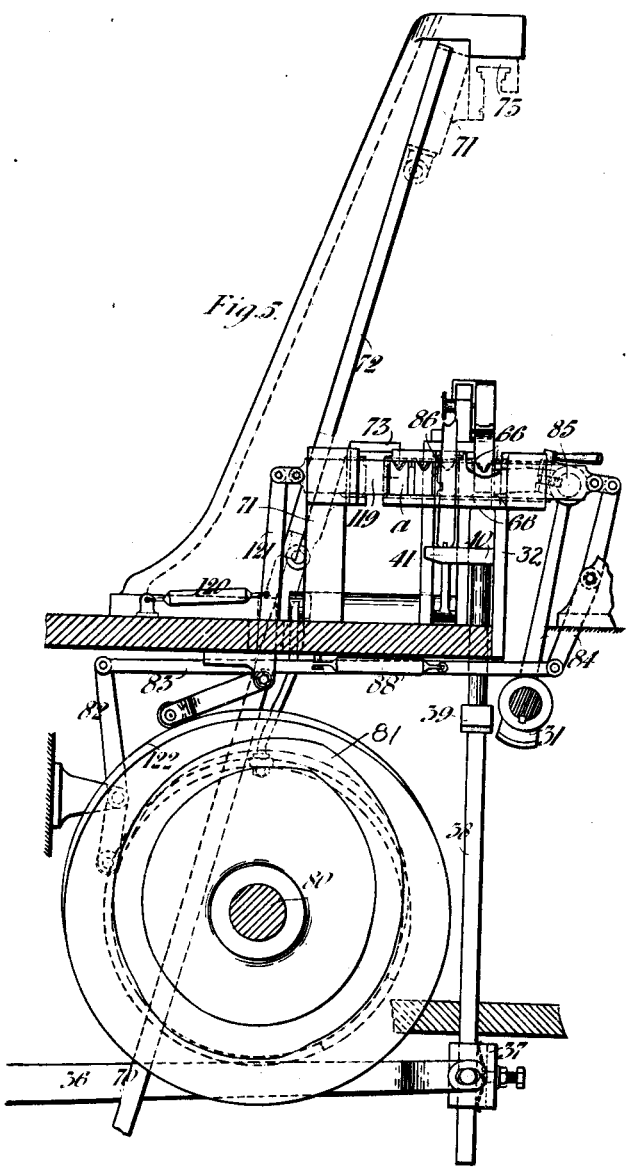

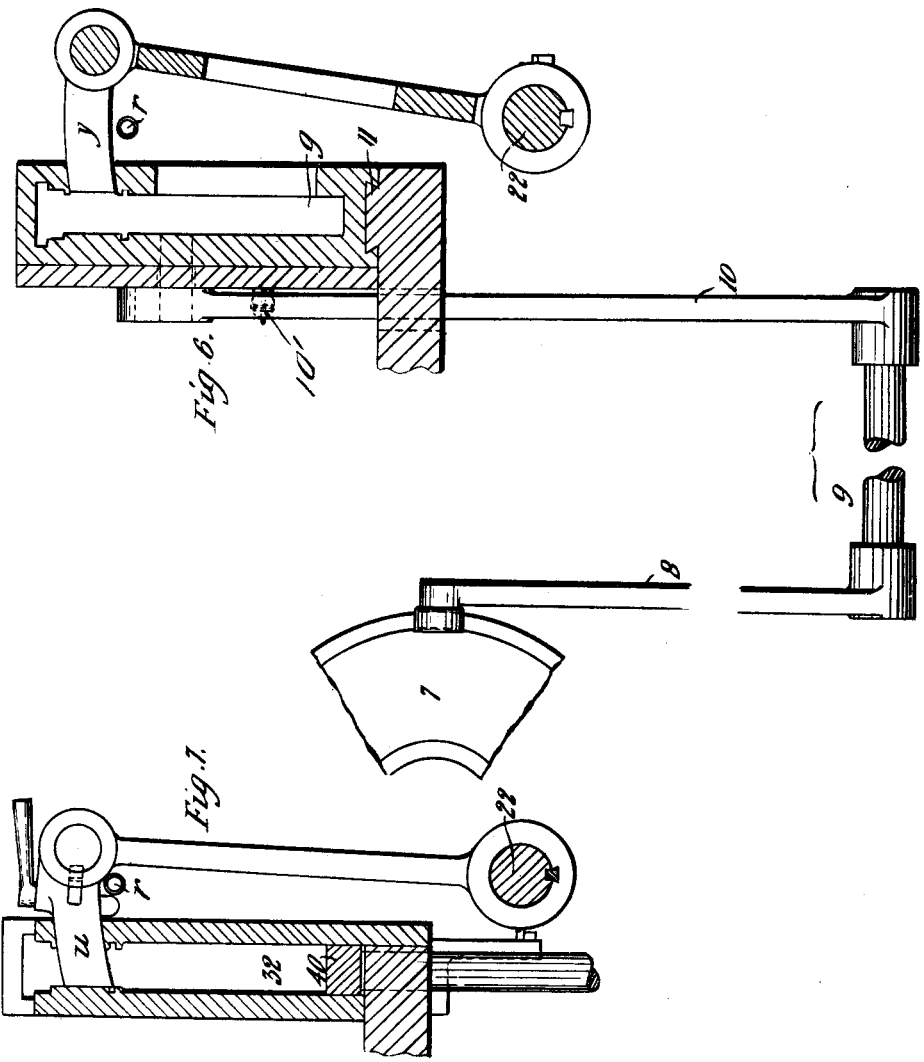

No. 675,829. Patented June 4, 1901.
H. J. S. GILBERT-STRINGER.
APPARATUS FOR COMPOSING AND JUSTIFYING MATRICES AND CASTING TYPES THEREFROM.
(Application filed May 18, 1900.)
(No Model.) 14 Sheets—Sheet 7.
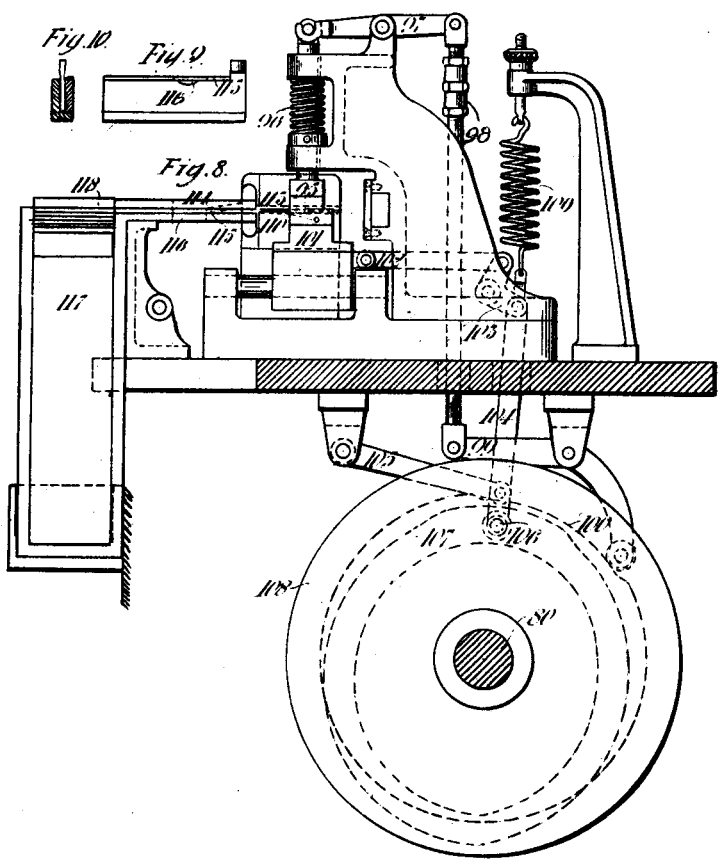

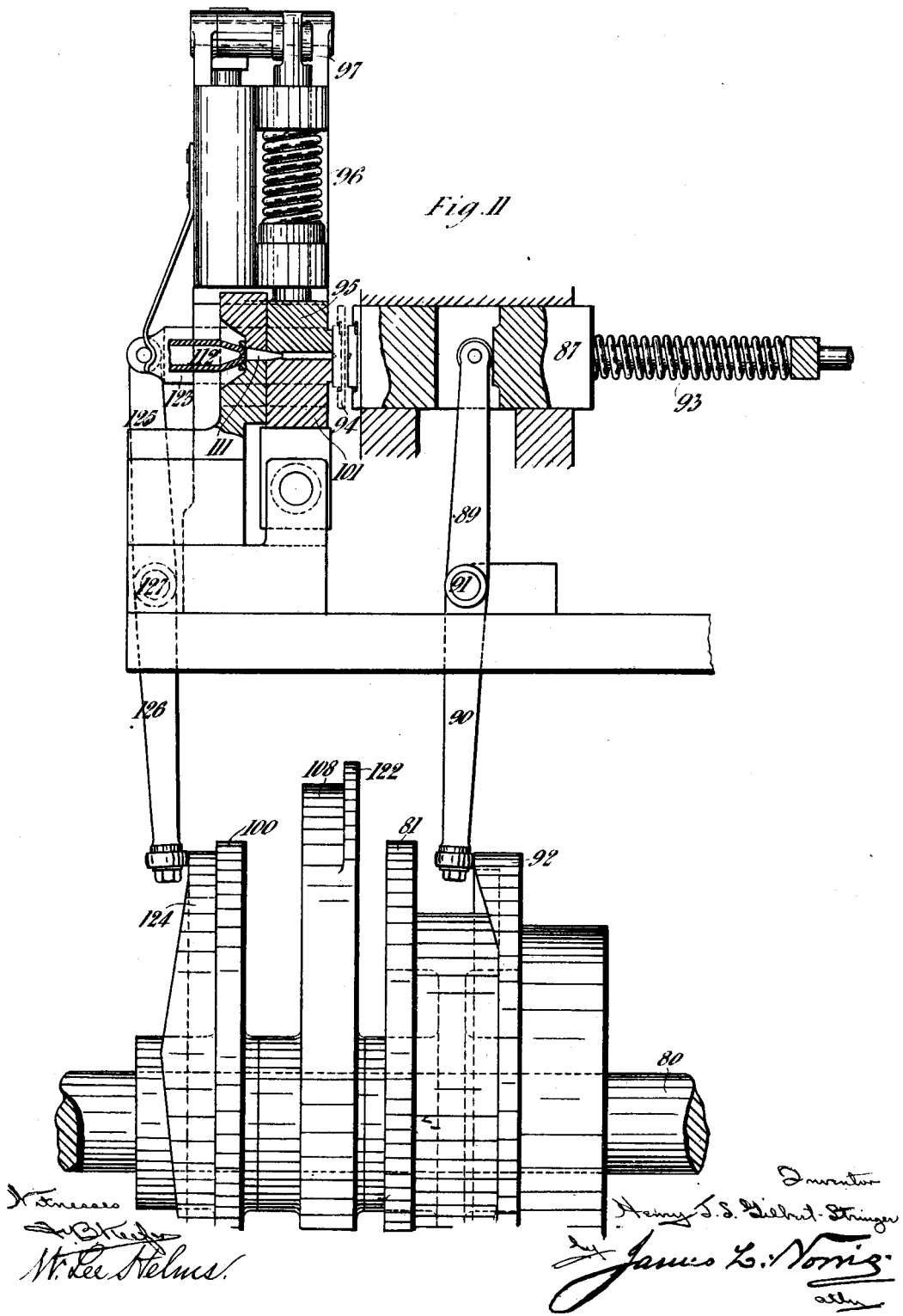

No. 675,829. Patented June 4, 1901.
H. J. S. GILBERT-STRINGER.
APPARATUS FOR COMPOSING AND JUSTIFYING MATRICES AND CASTING TYPES THEREFROM.
(Application filed May 18, 1900.)
(No Model.) 14 Sheets—Sheet 9.
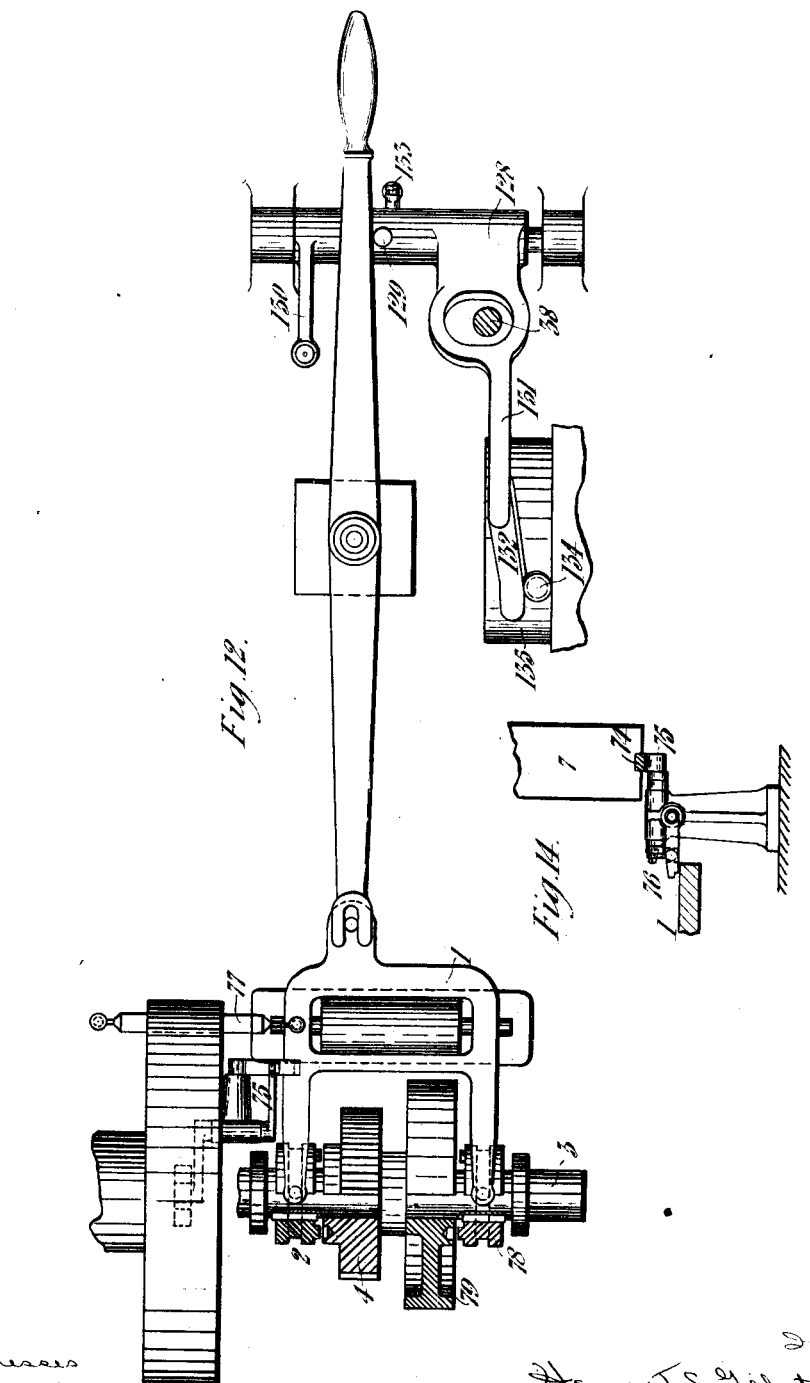

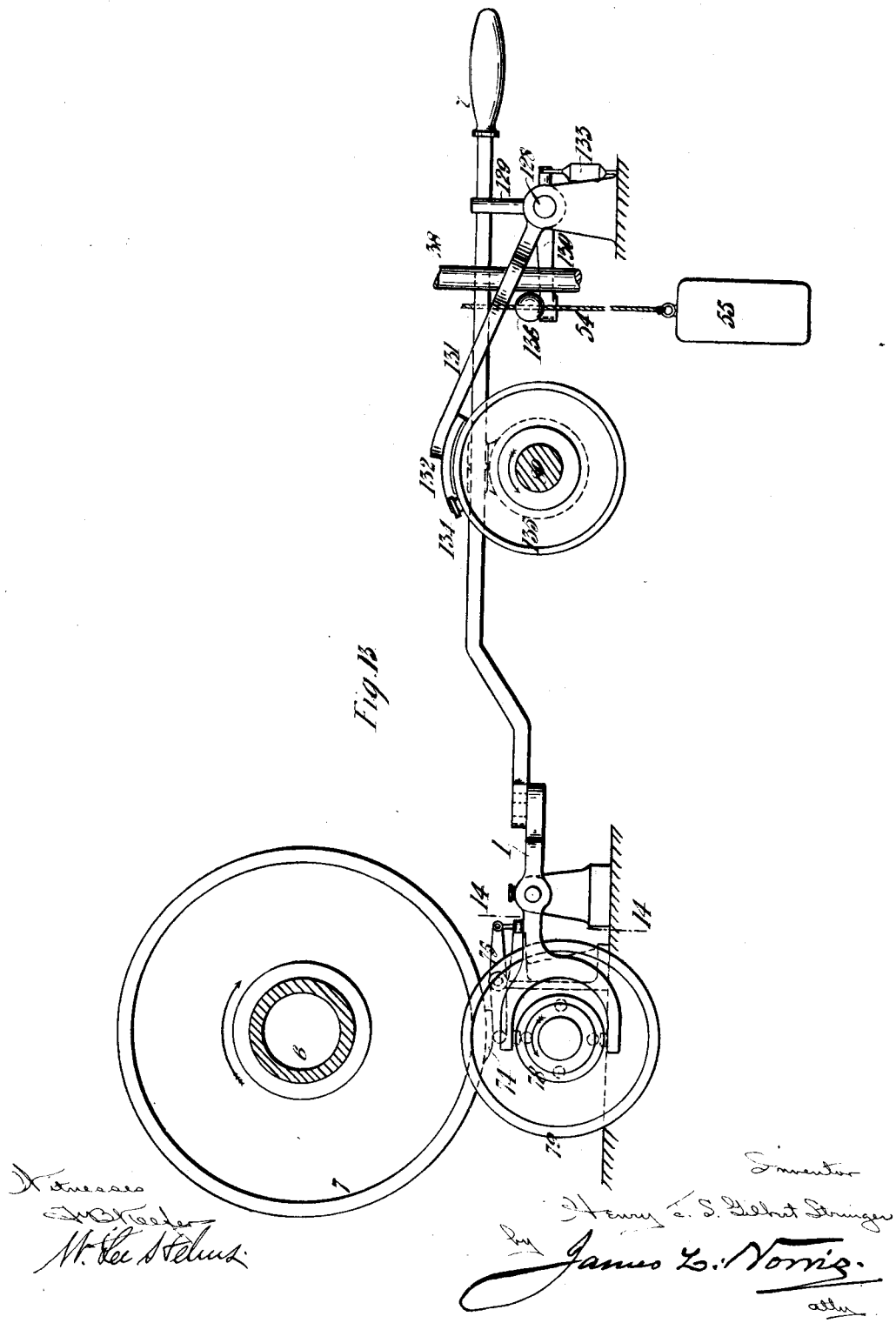

No. 675,829. Patented June 4, 1901.
H. J. S. GILBERT-STRINGER.
APPARATUS FOR COMPOSING AND JUSTIFYING MATRICES AND CASTING TYPES THEREFROM.
(Application filed May 18, 1900.)
(No Model.) 14 Sheets—Sheet 11.
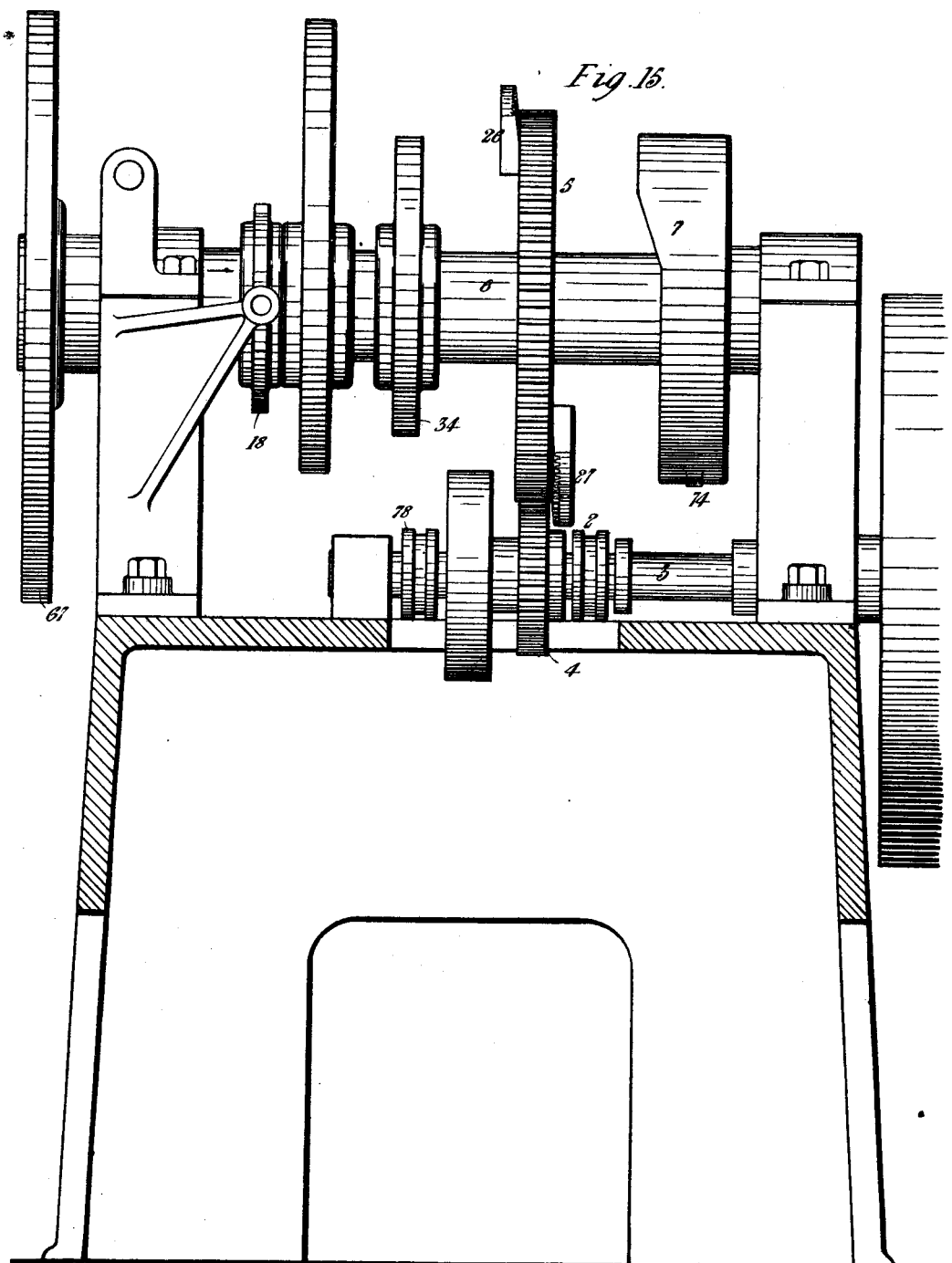

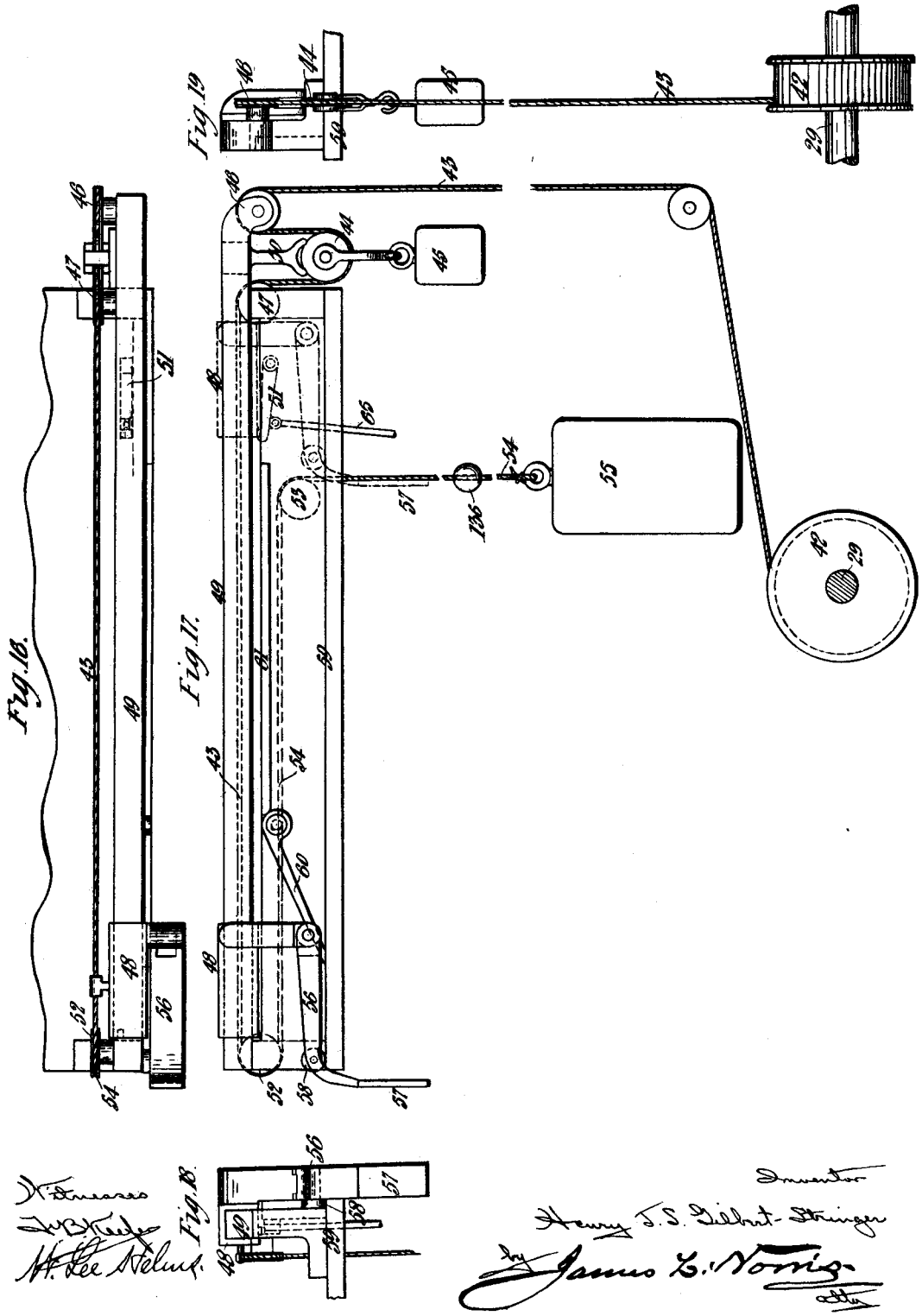

No. 675,829. Patented June 4, 1901.
H. J. S. GILBERT-STRINGER.
APPARATUS FOR COMPOSING AND JUSTIFYING MATRICES AND CASTING TYPES THEREFROM.
(Application filed May 18, 1900.)
(No Model.) 14 Sheets—Sheet 13.
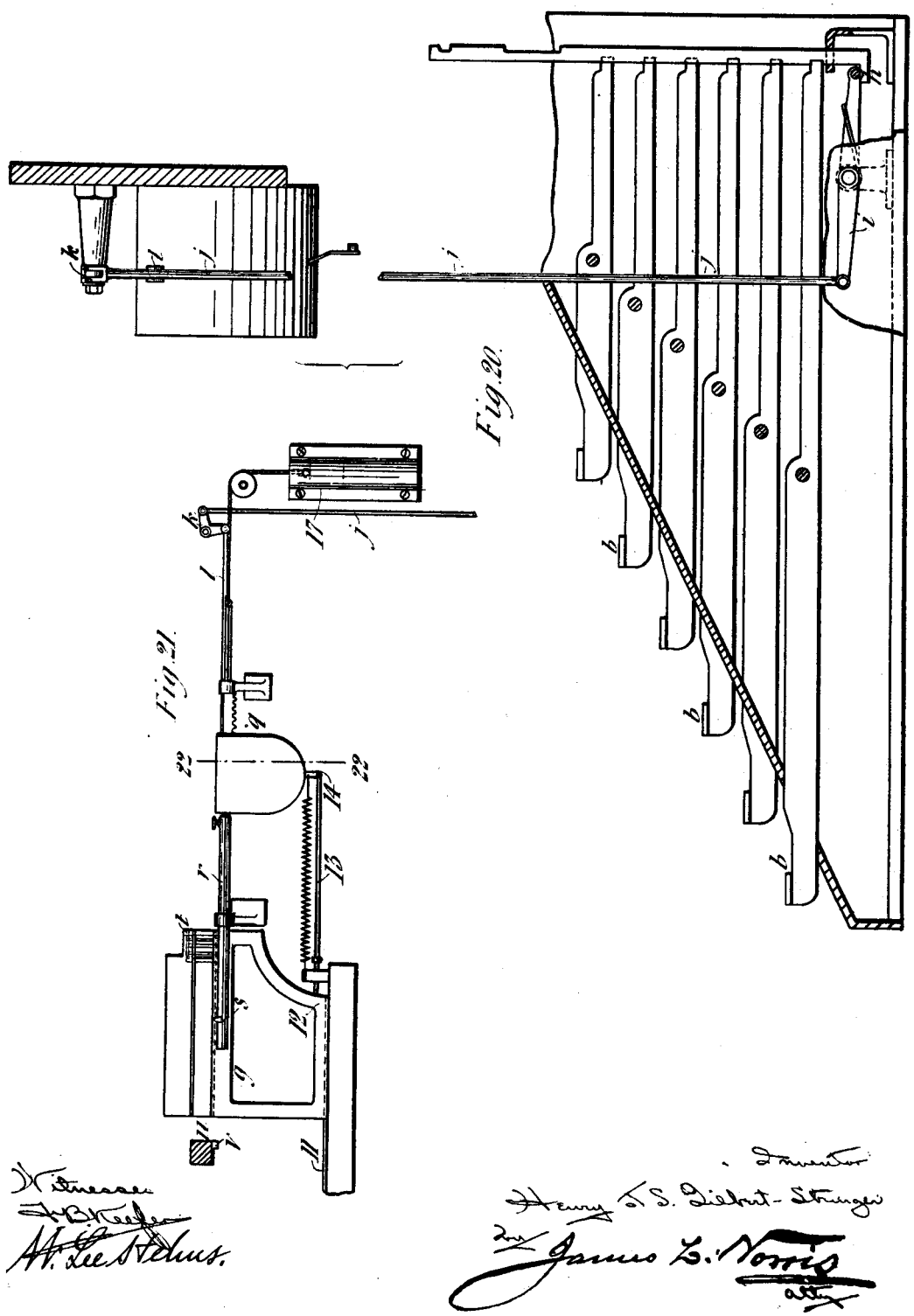

No. 675,829. Patented June 4, 1901.
H. J. S. GILBERT-STRINGER.
APPARATUS FOR COMPOSING AND JUSTIFYING MATRICES AND CASTING TYPES THEREFROM.
(Application filed May 18, 1900.)
(No Model.) 14 Sheets—Sheet 14.
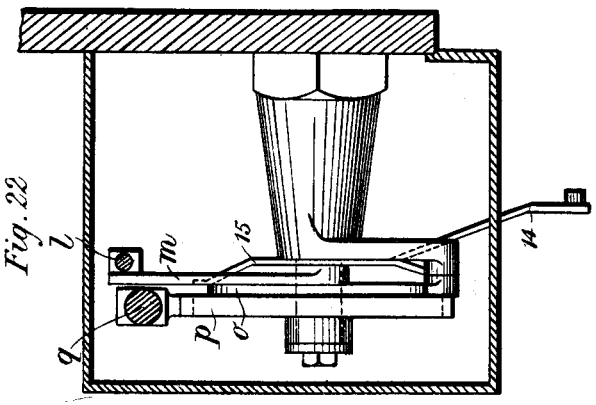
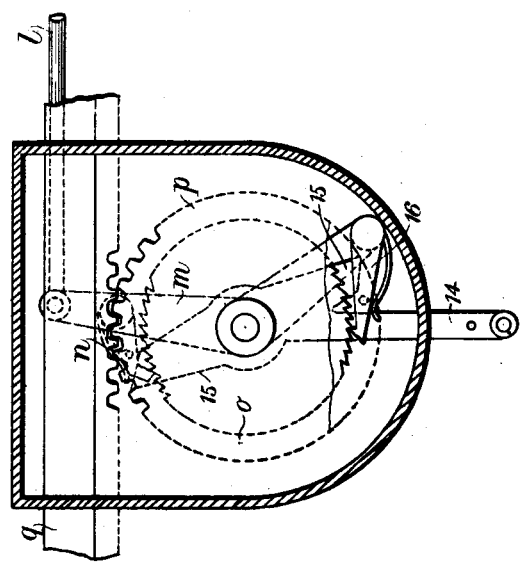

UNITED STATES PATENT OFFICE.

HENRY JAMES SYDNEY GILBERT-STRINGER, OF LONDON, ENGLAND.

APPARATUS FOR COMPOSING AND JUSTIFYING MATRICES AND CASTING TYPES THEREFROM.

SPECIFICATION forming part of Letters Patent No. 675,829, dated June 4, 1901.

Application filed May 18, 1900. Serial No. 17,150. (No model.)

*To all whom it may concern:*

Be it known that I, HENRY JAMES SYDNEY GILBERT-STRINGER, a citizen of England, residing at 35 Tavistock Crescent, Westbourne Park, London, England, have invented certain new and useful Improvements in Apparatus for Composing and Justifying Matrices and Casting Types Therefrom, (for which I have made application for patent in Great Britain, dated January 30, 1,900, No. 1,903,) of which the following is a specification.

In my application for patent, Serial No. 8,538, dated March 13, 1900, I have described apparatus for producing justified lines of individual types. As with this apparatus certain of the steps of operation require the immediate and personal attention of the operator, my present invention has for its object the reduction of the duties so devolving on the operator by providing automatic mechanism which performs the chief movements previously described as being done by hand at the right times, and consequently greatly simplifies the work of the operator.

In the following specification, in order to facilitate explanation, the whole of the mechanism is described and illustrated in the drawings, (except details of a matrix-magazine, keyboard, and matrix releasing and distributing mechanism, for which no claims are made, these being similar to parts embraced in patents referred to in my previous application). I would, however, have it understood that no claim is made for any of the individual parts included in my previous application for patent above referred to except in so far as they enter into new combinations which operate differently from those in which the same parts are included in my previous application.

The object of my present improvements may be briefly summarized as follows, and in this summary in order to facilitate comparison the reference number or letter indicating a part in the previous application is placed first in parenthesis along with the number or letter indicating the like part in the present application: First, the automatic traverse of the assembly-block ($r$ $g$) to and from the place at which the jaws of the justifying-vise ($t$ and $2 u$ and $y$) embrace the line of assembled matrices; second, the automatic gage, which, while registering the excess thicknesses introduced into the line, also indicates the proper time for justification and provides a register-piece, up to which one jaw of the justifying-vise can be advanced, so setting the jaws the proper width apart to secure accurate justifying of the line of matrices; third, an automatic partial rotation of the justifying-vise,($t$ and $2 u$ and $y$,) together with a traverse thereof to and from the place at which justification occurs; fourth, automatic actuation of the justifying bar or frame (4, 39, and 40) and retention of it in position throughout the period of casting; fifth, automatic introduction and actuation of the follower, (8 57,) which delivers the line of matrices to the mechanism for separating and delivering them singly to the casting mechanism; sixth, automatic stopping of the shaft,($o$ 6,) used for driving the self-acting parts of the mechanism above referred to, the cams upon it, and at the same time starting the shaft, ($q$ 80,) which carries cams controlling the mechanism for matrix-separating, casting, reassembling for distribution and for type-delivering, and, seventh, automatic stopping of the last-mentioned shaft ($q$ 80) upon completion of the casting of the characters and spaces in the line, thus producing a rest in the operation effected by the rotations of the shafts ($o$ 6 and $q$ 80) until they are again thrown into successive action by the starting-lever,($m z$,) moved by the operator.

I shall now describe apparatus according to my present invention, referring to the accompanying drawings.

Figure 1 is a front view. Fig. 2 is an elevation of the left-hand end. Fig. 3 is a plan. The other figures showing details are drawn to enlarged scales. Fig. 4 is a plan of the parts for assembling and justifying the lines of matrices. Fig. 5 is an end elevation, looking from the left, of the parts for moving the matrices to and from the mold. Fig. 6 is a transverse section of the assembly-block, showing the justifying-vise out, with elevation of cam and lever for moving the assembly-block. Fig. 7 is a transverse section of the race for the line of matrices, showing the justifying-vise in. Fig. 8 is an elevation, looking from the right, of the parts for casting and assembling the type. Fig. 9 is a plan, and Fig. 10 is a section, of the type-channel.

Fig. 11 is a section with part in elevation of the type-mold and its adjuncts. Fig. 12 is a plan, and Fig. 13 an end view, looking from the left, of the clutch for alternating the shaft movements. Fig. 14 is a transverse section on the line 14 14 of Fig. 13. Fig. 15 is an elevation of the hinder cam-shaft and gearing. Fig. 16 is a plan, Fig. 17 an elevation, and Figs. 18 and 19 are elevations of the respective ends of the apparatus for advancing the justified line of matrices. Fig. 20 is a transverse section through the keyboard, showing the lever for moving the gage mechanism. Fig. 21 is an elevation of the gage mechanism. Fig. 22 is a section on the line 22 22 of Fig. 21. Fig. 23 is an elevation of the mechanism shown in Fig. 22, the front of the casing being removed. Fig. 24 is a perspective view of one of the character-matrices. Figs. 25, 26, and 27 are respectively a front view, side view, and a perspective view of one of the space-matrices.

The character-matrices, one of which, $a$, is shown in Fig. 24, are in some respects similar to those employed in the linotype system, but have their intaglio characters upon the face instead of on the edge, and while linotype-matrices are always of the thickness of the "set" of the character which they represent some only of those used by me to produce the thicker character-types, such as "m," are of the same thickness, and in the case of matrices used to produce thin types each of these has added to it an additional thickness, which is the same in all instances—say 0.1 inch—such addition being made to permit of a deep "strike" being made when impressing the matrix. These matrices are held in separate magazines, from which they are released by the depression of finger-keys $b$ in the same manner as in the linotype apparatus as described in the United States Patent No. 436,532, and as this forms no part of my invention I do not further describe it. The matrices after having passed through the movements for assembling the line, justifying, separating for casting and again assembling, as will hereinafter be described, are distributed into their respective magazines in the same way as in the linotype apparatus and as described in the patent above referred to.

Each space-matrix, as shown in Figs. 25, 26, and 27, consists of two parts—a blade $c$, which is tapering in thickness and also in width, becoming equably thicker and wider from its upper end downward and having along its face an undercut groove $d$, in which slides a dovetail rib projecting from the back of an oppositely-tapered sliding piece $e$, which has on one side a rectangular notch $f$. The piece $e$ has at its sides projecting shoulders, by which the matrix is suspended, and these space-matrices are released, assembled, and distributed in a manner similar to that in which the linotype space-matrices are so dealt with.

The blade $c$ and part $e$ of each space-matrix measure in thickness when the blade is at its lowest point the thickness of the thinnest space plus 0.1 inch, and the taper of $c$ is such that when at its highest point this measurement becomes that of the thickest space plus 0.1 inch. In assembling a line of matrices made up of some having the natural thickness of the types and some, including the space-matrices, having the added thickness the line has to be so much longer than it would be if all the matrices were of natural thickness by the sum of all the added thicknesses. Every key that selects a matrix having the added thickness is therefore connected by mechanism to a gage-rod $r$, as hereinafter described.

The operator in composing a line depresses the keys $b$, which liberate the required matrices from magazines similar to those used in the linotype-machine, their discharge, collection, and advance in an assembly-block $g$ being identical with that described in Patent No. 436,532. In the present instance, however, the line of matrices is made up of some having the natural thickness of the types and some, including the space-matrices, having the added thickness. Therefore the justifying-vise cannot be, as in the linotype system, of a fixed length for each line, and the operator must be furnished with a simple means of setting the jaws apart the length of line desired plus the sum of such additional thicknesses. Therefore such of the keys as relate to matrices to which have been added the before-mentioned thickness in releasing the matrix actuate by means of tappets $h$, Fig. 20, added to the key-rods, where necessary, the rocking frame $i$, which passes under all the keys, and working through a rod $j$, a bell-crank $k$, and a rod $l$ drives the lever $m$. This lever carries a pawl $n$, which works a ratchet-wheel $o$. A pinion $p$, fixed to the ratchet-wheel, thus moves the rack-rod $q$, adjustably connected to the register-rod $r$, intermittently to the left, each step of its advance being equal to the added thickness of each matrix introduced into the line that has such addition to its thickness. The register-rod $r$ is provided with a pointer $s$, and when the rack-rod $q$ is in the position which it occupies before being moved by any of the keys the rod $r$ is so adjusted that its pointer $s$ is at a distance from the latch-pieces $t\ t$, Fig. 4, which retain the matrices in the assembly-block equal to the length of line of types to be produced. Consequently when the first or leading matrix in a line nearly overtakes the pointer $s$ the operator has indicated to him the fact that sufficient matrices have been delivered to nearly fill a line and therefore that justification should be proceeded with. It would of course be possible, if deemed an advantage, to provide the rod with a projection which on being encountered by the advancing line of matrices would ring a warning bell, acting either through mechanical or electrical connections. The operator now moves the sliding jaw $u$ of the justifying-vise toward the right until a projection $v$ on its under side touches the end of the rod $r$. The jaw $u$ has a spring-tooth $w$ engaging in a ratchet-rack formed on the bar $x$ of the vise. As the end of the rod $r$ when at its zero-point is distant from the right-hand jaw $y$ of the vise by the length of line to be produced and as it is advanced one step for every matrix having the additional thickness (0.1 inch) over and above the set width of the matrices introduced, it obviously measures the width that the sliding jaw $u$ and the fixed jaw $y$ of the justifying-vise require to be apart. Therefore when the line held between the jaws of the vise is justified by the swelling of the space-matrices the types and spaces subsequently cast from the matrices make up a justified line. The operator then moves the hand-lever $z$, Fig. 3, to the right, actuating the guide-frame 1 and carrying with it the feather-driven clutch-piece 2 on the shaft 3, (which shaft is driven from any convenient motor,) thus engaging the clutch with the pinion 4 and causing a spur-wheel 5, Fig. 2, to make one complete revolution, together with its shaft 6. Upon this shaft is fixed a cam 7, the face of which acting on a roller mounted on an arm 8 moves a rocking shaft 9, another arm 10, on which moves the assembly-block $g$ along its slide 11 to the left, bringing the line of matrices opposite to the mouth of the justifying-vise, the arm 10 being returned to its primary position by a coiled spring, as 10', connected thereto and to the framework. The movement of the assembly-block to the left removes its corner 12, Fig. 21, from the end of a spring-rod 13, which is then moved by its spring, and so moves a lever 14, which is connected to a frame 15. This frame being thus partially rotated by means of its inclined ends acting on pins on the spring-pawl $n$ and retaining-pawl 16 disengages these from the ratchet-wheel $o$, allowing the rack-rod $q$, together with the gage-rod $r$, to be returned to its normal position by means of a weight 17. When this is done, a cam 18 on the shaft 6, working through a plunger 19, arm 20, on a rocking shaft, and a rod 21 actuates an arm of a rocking shaft 22, which carries the frame of the justifying-vise. A weight 23 being thus permitted to descend partially rotates the rocking shaft 22, and thus causes the jaws $u$ and $y$ to enter the assembly-block $g$ and embrace the line of matrices between them. The partial rotation of the vise withdraws a pin 24 from a spring-latch 25 and leaves the vise free to advance to the left. This movement is effected in the following manner: On the sides of the wheel 5 are fixed two bevel-toothed segments 26 27, which separately gear with a bevel-pinion 28 on one end of a spindle 29, the other end of which has on it a pinion 30, gearing with a segmental rack 31 on the justifying-vise. Thus when the segment 26 comes in gear with the pinion 28 it turns the spindle 29 and pinion 30, thus moving the vise to the left and carrying the matrices into the justifying-race 32. The assembly-block after the matrices are removed from it is permitted by the cam 7 to return to the right in obedience to a spring applied to the arm 10. The justifying-vise on reaching its extreme left position is caught by a spring-latch 33, and while so retained a cam 34 on the shaft 6, acting on an arm 35 of a bell-crank lever, raises the other arm 36 and by means of a friction-block 37 elevates a rod 38, carrying the justifying-frame 39. The top bar 40 of this frame pushes up the pendent blades $c$ of the space-matrices, which owing to their tapering thickness push the character-matrices on each side of them until the line exactly fills the space between the jaws of the justify-vise. As the blades $c$ of the space-matrices increase equally in width as well as thickness from the top downward, the angle of both tapers being the same, the farther they are pushed up by the justifying-bar 40 the wider is the part of the blade which afterward when the matrix is at the mold determines the width of the space cast. The cam 34 is such as would cause elevation of the space-blades to their extreme limit, unless, as is nearly certain to be the case, they are checked by the filling of the space between the jaws of the vise, this being allowed by the friction-block 37 slipping on the rod 38. An essential difference in this mechanism and its action as compared with the justifying devices in linotype-machines is that the latter are spring-propelled and if after justification the jaws of the vise were withdrawn would continue rising under spring-pressure and destroy the justification. The present device, seeing that it is essential it should maintain its justifying position once this is arrived at, is cam-driven; but the ability of the bar to slip under pressure through the friction-block supplies the required variability of height, determined by justification and maintained while the matrices subsequently freed from the controlling pressure of the jaws of the vise are separately handled and casts taken from each of them. When the justifying-frame reaches its highest point, it is held in that position by the cam 34 until all the character and space types in the line have been cast. The justifying-bar 40 extends out to the front of the mold and has an arm or continuing platform 41 projecting at a right angle to it. Thus the blades $c$ of the space-matrices when they are moved along and onto this platform, as will be presently described, are maintained at the same height to which they had been raised, as described, until they are all cast from. After the justification the cam 18 moves the jaws of the vise out of the raceway 32, thus freeing it from the latch 33, and the segment 27 then acting on the pinion 28 moves the vise back to the right, in which position it is retained by the spring-latch 25. While the vise before justification is moving from right to left a drum 42 on the spindle 29 winds up the slack of a cord 43, which carries a sling-pulley 44 and weight 45, runs over fixed pulleys 46 and 47, and is attached to a box 48, sliding on a square bar 49. When the sling-pulley 44 encounters the fork 50, it is prevented from rising higher, and thereupon the cord 43 draws the box 48 to the right, where it is held by a latch 5. Also attached to the box 48 and running over pulleys 52 and 53 is a cord 54, carrying a heavy weight 55, which is elevated by the described movement of the box 48. The box carries on it a lever 56, the lower extremity of which is a rectangular plate 57. The lever also carries on its side toward the end a roller 58. On the box 48 being moved to the right this roller travels on a path 59 until it meets the inclined switch 60, up which it runs to a higher path 61, and its plate 57 is thus lifted out of the path of the matrices which are advancing to the left below 59. When the roller 58 reaches the end of the upper path 61, it with lever 56 and blade 57 drops first upon the jaw $y$ of the justifying-vise which is then beneath it. On the vise being withdrawn the lever and blade 57 fall until the roller 58 again rests upon the path 59, the blade 57 being then behind the line of justified matrices. The traverse of the vise from left to right causes a pin 62 upon it to act upon an arm 63 of a rocking shaft, another arm, 64, of which, by means of a rod 65, disengages the latch 51, leaving the box 48 free to be moved to the left by the weight 55. During the movement of the vise from left to right the drum 42 unwinds the cord 43, which is kept sufficiently tightened by the weight 45. The blade 57 acting as a follower on the line of matrices moves them with it to the left until the foremost matrix is stopped by its four corners encountering check-pieces 66, two on each side. The shaft 6, besides the cams referred to above, carries on it cams for actuating the collecting and elevating mechanism and parts which deliver the matrices to the distributer. While the movements already described are taking place a cam 67 operates an arm 68 on a rocking shaft, another arm, 69, on which, by means of a rod 70, raises a block 71, which is fitted to slide up along the face of a bracket 72. It carries with it a collecting-channel 73, containing matrices from which casts have already been made. The channel is raised to the position shown in dotted lines in Fig. 5 with matrices suspended in it. From this position the matrices are transferred onto the elevator and distributed into their respective magazines in the same manner and by the same mechanism as that by which the linotype-matrices are handled, as described in the patent already referred to. After the matrices are removed from the channel 73 it returns to its lower position to receive a fresh charge of matrices. The shaft 6 having nearly completed its revolution, a projection 74 on cam 7 moves one arm of a lever 75, the other arm of which lifts a catch 76, releasing the clutch-frame 1, which, urged by the spring 77, first disengages the clutch-piece from the pinion 4, thus stopping the shaft 6. It then causes the clutch-piece 78 to engage a pulley 79 and by means of a belt to rotate shaft 80 in the direction of the arrow in Fig. 13. On this shaft is a cam 81, which in the course of its revolution, by means of a lever 82, a connecting-rod 83, and another lever, 84, actuates a delivery-plunger 85 of rectangular section and advances the foremost matrix laterally along a guideway until it reaches a position 86, Fig. 4, in a recess in front of a matrix-plunger 87. The delivery-plunger 85 is then retracted by a spring 88. During this movement the blades of the space-matrices are supported, as already described, on the projection 41 from the bar 40, so maintaining the position they arrived at in justification. The matrix-plunger 87 is connected through arms 89 and 90 of a rocking shaft 91 to a roller bearing on a cam 92 and is urged by a spring 93. When the cam 92 in the course of its revolution permits, the spring 93 urges the matrix-plunger 87 forward, pushing the matrix close against the face of the type-mold, as shown in dotted lines at 94 in Fig. 11. This mold has a vertically-movable upper piece 95, which is urged downward by a spring 96 and is connected through lever 97, adjustable rod 98, and lever 99 to a roller bearing against a cam 100. Under the piece 95 is a horizontally-movable piece 101, connected through link 102, bell-crank 103, and rod 104, guided by radius-rod 105, to a roller 106, engaged in the path 107 of a cam 108. The rod 104 has attached to it a spring 109, and the cam-path 107 has a portion widened to allow this spring to act and push the piece 101 to the left until a pin 110 upon it bears against the bottom of the lateral notch $a^x$ in the edge of the character-matrix which is then facing the mold, thus determining the width the mold will remain open.

In the case of a space-matrix when the blade $c$ of the space-matrix is pushed up by the justifying apparatus, as already described, it increases it in thickness, and at the same time the part of the blade level with the center of the notch $f$ becomes proportionately wider, and when the space-matrix reaches the mold the pin 110 on the horizontally-sliding part of the mold is stopped by meeting the edge of the blade at that point, and this determines the width of the mold and the thickness of the space-type cast from it. In other words, the blade $c$ of each space-matrix having been pushed up until it, conjointly with $e$, measures in thickness 0.1 inch more than the required space, the width of $c$ on a line drawn through the center of $f$ being suited to that thickness determines the position of the pin 110 when it is stopped by the blade, and therefore the position of the lower movable part 101 of the mold, such as to give the mold the width required for the space-type. At the back of the pieces 95 and 101 are covering-pieces so formed and fixed that a space is formed to receive a tailpiece 111, shaped as a tang and projecting back from the lower piece 101. There is also a short vertical channel above the tang-channel in which can move a projection from the back of the piece 95. When the mold-pieces are in the position shown in Figs. 8 and 11, with a matrix in front of them, molten metal is injected from a nozzle 112 in the usual way, so as to cast a type with a prolonged tang. The lower piece 101 is then moved a little to the right, releasing the matrix, which is withdrawn by the plunger 87. The top piece 95 is then raised and the lower piece 101 is moved to the left, carrying with it the type along the tang-shaped channel 113, in which it is left suspended as a cantaliver by its tang, when the lower piece 101 again returns to the right. As type after type is thus cast and moved along the tang-channel the foremost is pushed into a delivery-channel 114, in which the body of the type is held, while its tang projects free beyond the tang-shaped channel. Each type as it is moved along the channel 114 passes an inclined cutting-blade 115, by which the tang is cut off, and farther on its foot in passing several saw-teeth 116 has the heel-nick cut in it. From the channel 114 the types are delivered into the galley 117, forming a line above the lines already delivered. As each line is completed the types are pressed down by a hand-lever 118 to make room for a fresh line, a movable rule being preferably interposed, so that the fresh types may slide along it. Each matrix after it is removed from the mold by the plunger 87 is pushed along sidewise by the succeeding matrix, actuated by the plunger 85, until it meets a plunger 119, which is retracted by a spring 120 and moved forward by a lever 121, actuated by a cam 122. This cam is so formed that when the matrix meets the plunger 119 the plunger can retire at the same rate as the matrix advances, the plunger supporting the matrix by having its front engaged between the lateral shoulders of the matrix. The matrix is thus moved to a position in front of a plunger 123, which is actuated by a cam 124 through arms 125 and 126 on a rocking shaft 127. By the plunger 123 the matrices are successively advanced into the collecting-channel 73, previously mentioned. As soon as the last matrix has been cast from and withdrawn from the mold the shaft 80 is automatically thrown out of action at the completion of its revolution by the mechanism shown in Figs. 12 and 13—that is to say, immediately under the lever $z$ there is a sleeve 128 on a spindle, upon which it can slide and turn a little, and it has on it a pin 129, against which the lever $z$ bears. It has also an arm 130, through a hole in the end of which passes the weighted cord 54, and another arm 131, which carries at its end a curved blade 132, having an inclined edge. This arm 131 is held by a light spring 133, so that its blade 132 is clear away from a headed pin 134, projecting from a roller 135, which is fixed on the shaft 80. When, however, the box 48, Fig. 17, has reached its extreme position on the left, a ball 136, fixed on the cord 54, impelled by the weight 55, moves the arm 130, and thereby turns the sleeve partly around, bringing the blade 132 in the path of the pin 134. Then as the roller 135 revolves, its pin 134, acting on the inclined blade 132, moves it and the sleeve 128 to the right, so that the pin 129 on the sleeve moves the lever $z$ to its middle position, in which neither of the clutches 2 and 78 is engaged.

I would have it understood that I make no separate claim for a set of magazines for character and space matrices nor for means of distributing the matrices in their respective magazines or of releasing them in suitable order by finger-keys, such means having been already described in the Patent No. 436,532 and employed in linotype-machines.

Obviously the principles involved in producing printing-forms according to my invention are susceptible of being embodied and carried out by various forms of mechanisms without departing from the spirit of my invention, and all such mechanical equivalents are therefore within the scope of my invention.

Having thus described the nature of this invention and the best means I know of carrying the same into practical effect, I claim—

1. In apparatus for composing and justifying matrices and casting therefrom individual character types and spaces, the combination with the justifying device including jaws of the cam 7 and arm 8, rock-shaft 9, arm 10 and matrix assembly-block 11 and its retracting-spring, whereby the assembly-block is moved to bring the matrices into position to be engaged between the jaws of the justifying device, substantially as described.

2. In apparatus for composing and justifying matrices and casting individual character and space types therefrom, the combination of the tappets $h$ on composing-rods for matrices having added thickness, the lever $i$, rod $j$ bell-crank $k$, rod $l$ and lever $m$, pawl $n$, ratchet-wheel $o$, rack-rod $q$ and register-rod $r$ with pointer $s$, releasing-rod 13 lever 14 and frame 15 adapted to disengage pawls $n$ and 16, whereby the length of the line of matrices is indicated to the operator, substantially as described.

3. In apparatus for composing and justifying matrices and casting individual character and space types therefrom, the combination of cam 18, plunger 19, lever 20, rod 21, arm of rocking shaft 22 and weight 23, whereby the arms $u$ and $y$ of the justifying-vise are raised to enter the assembly-block and embrace the line of matrices, substantially as described.

4. In apparatus for composing and justifying and casting individual character and space types therefrom, the combination with the justifying-frame, of the cam 34, lever-arms 35 and 36, a rod carrying the justifying-frame, and friction-block 37 for elevating said rod and thereby the justifying-frame, substantially as described.

5. In apparatus for composing and justifying matrices and casting individual character and space types therefrom, the combination of a justifying device, the wheel 5, means for actuating said wheel, the toothed segments 26 and 27 on the wheel 5, the bevel-pinion 28, spindle 29, pinion 30 and segmental rack 31 whereby the justifying-vise embracing the line of matrices is moved to and fro, substantially as described.

6. In apparatus for composing and justifying matrices and casting individual character and space types therefrom, the combination of the lever $z$, sleeve 128 with pin 129, arms 130 and 131, the latter with curved blade 132, roller 135 with pin 134, and ball 136 on weight-cord 54, whereby the lever $z$ is moved to withdraw the clutches on shaft 3, substantially as described.

7. In apparatus for composing and justifying matrices and casting individual character and space types therefrom, the combination of the drum 42, cord 43, sling-pulley 44, guide-pulleys 46 and 47 and sliding box 48, latch 51, also cord 54 with its guide-pulleys and weight 55, paths 59 and 61, and switch 60, operating with lever 56 and its plate 57, whereby the line of matrices is advanced toward the type-mold, substantially as described.

8. In apparatus for producing individual character and space types for inclusion in a form for printing, the combination with mechanism for assembling character-matrices and space-matrices in line, of mechanism for producing justified lines of individual character and space types from the previously-assembled lines of matrices, substantially as described.

In testimony whereof I have hereunto set my hand in presence of two subscribing witnesses.

HENRY JAMES SYDNEY GILBERT-STRINGER.

Witnesses:
ERNEST H. KEMPE,
L. KING.